United States Patent [19]

Maiocco

[11] 4,308,635
[45] Jan. 5, 1982

[54] DEVICE FOR CONNECTING A WIPER BLADE HOLDER TO A WIPER ARM

[75] Inventor: Guiseppe Maiocco, Rivoli, Italy

[73] Assignee: Arman S.p.A., Druento, Italy

[21] Appl. No.: 134,307

[22] Filed: Mar. 26, 1980

[30] Foreign Application Priority Data

Mar. 30, 1979 [IT] Italy .............................. 67668 A/79

[51] Int. Cl.³ .............................................. B60S 1/40
[52] U.S. Cl. ................................................. 15/250.32
[58] Field of Search .................. 15/250.32–250.42

[56] References Cited

U.S. PATENT DOCUMENTS

| | | | |
|---|---|---|---|
| 2,925,616 | 2/1960 | Krohm | 15/250.32 |
| 3,082,463 | 3/1963 | Bock et al. | 15/250.32 |
| 3,147,506 | 9/1964 | Williams | 15/250.32 |
| 3,657,762 | 4/1972 | Arman | 15/250.32 |
| 4,094,038 | 6/1978 | Hancu | 15/250.32 |
| 4,114,227 | 9/1978 | Blackman | 15/250.32 |
| 4,177,537 | 12/1979 | Roadarmel | 15/250.32 |
| 4,195,382 | 4/1980 | MacPherson | 15/250.32 |

FOREIGN PATENT DOCUMENTS

| | | | |
|---|---|---|---|
| 228998 | 7/1960 | Australia | 15/250.32 |
| 1090121 | 9/1960 | Fed. Rep. of Germany | 15/250.32 |
| 1251670 | 10/1967 | Fed. Rep. of Germany | 15/250.32 |
| 2340481 | 2/1975 | Fed. Rep. of Germany | 15/250.32 |
| 2812413 | 10/1979 | Fed. Rep. of Germany | 15/250.32 |
| 2421765 | 11/1979 | France | 15/250.32 |

*Primary Examiner*—Peter Feldman
*Attorney, Agent, or Firm*—Wegner, Stellman, McCord, Wood & Dalton

[57] ABSTRACT

A connector or adaptor is provided for connecting several different style windshield wiper arms to a crosspin of a crosspin-type wiper blade. The connector or adaptor includes a one-piece tubular portion having inwardly urged detents, tabs or lips which engage in openings in the arm ends to latch the connector or adaptor to the end of the arm. The connector or adaptor has a pair of spaced walls with restricted openings merging into aligned apertures which apertures are adapted to receive the crosspin of the blade when said restricted openings are forced down over the pin. Several style arm ends with aligned openings in the opposite side walls can be connected to the connector or adaptor.

11 Claims, 15 Drawing Figures

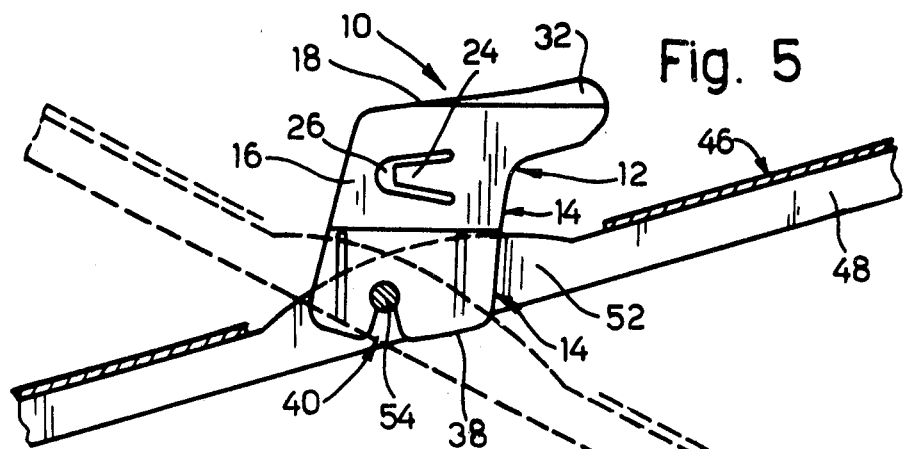
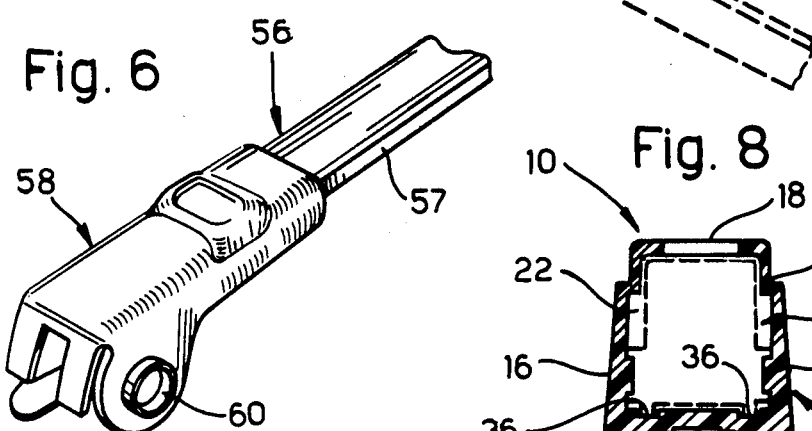
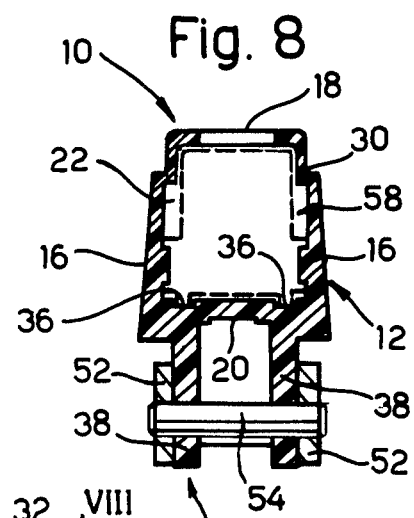
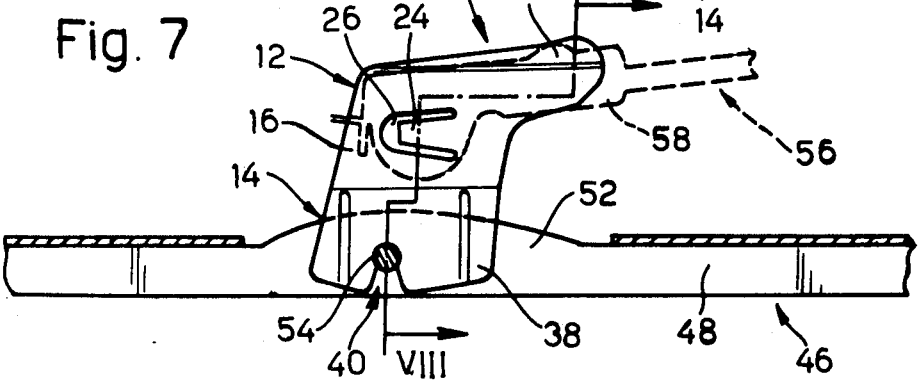

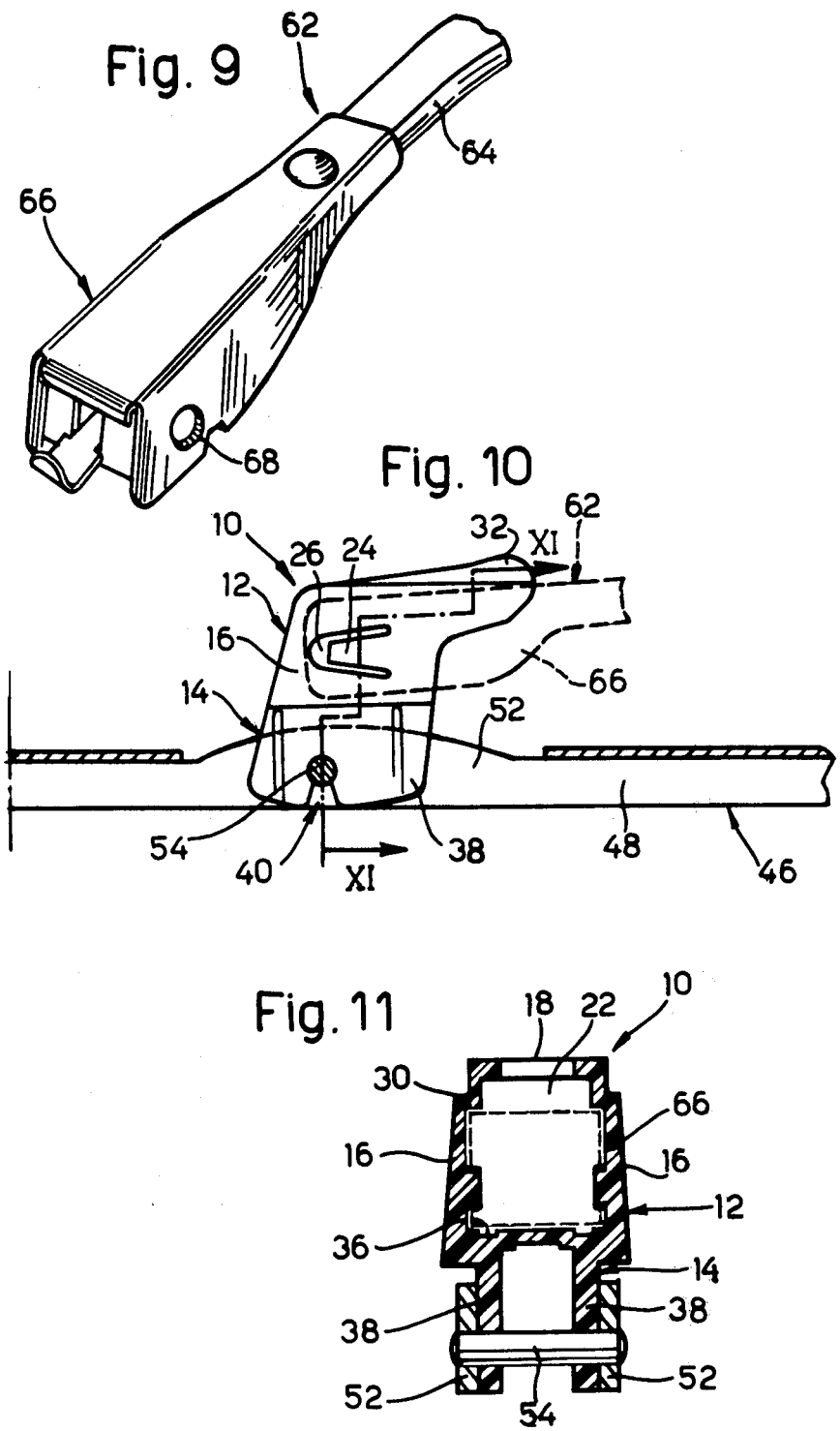

DEVICE FOR CONNECTING A WIPER BLADE HOLDER TO A WIPER ARM

BACKGROUND OF THE INVENTION

1. Field of the Invention

This invention relates to windshield wiper arms and blades and, more particularly, to a connector or adaptor for connecting a plurality of styles of windshield wiper arms to a particular wiper blade.

2. Description of the Prior Art

One currently popular wiper blade is designed for a dorsal fitting and comprises a superstructure having a substantially rectangular central opening with a transverse rivet or pivot pin in the portion corresponding to said central opening. There are also several style wiper arms designed for receiving a lateral fitting at its free end portion, which fitting comprises a connecting part provided with two laterally aligned openings.

At present there are on the market a large number of wiper arms designed for a lateral fitting and provided with connecting parts of different forms and dimensions. Thus, the manufacturers of wiper blades for the replacement market are forced to provide their wiper blades with a certain number of loose connectors which each makes it possible to mount the wiper blade on a wiper arm of a certain type. This increases the sales price of the wiper blade and complicates the fitting of the wiper blades onto the wiper arms.

The technical problem which is to be solved is to provide a connecting device or connector for attaching a wiper blade designed for a dorsal fitting to wiper arms of different types designed for a lateral fitting, in order to easily connect and disconnect either the wiper blade or the wiper arm and, moreover, in order to diminish the manufacturing costs.

SUMMARY OF THE INVENTION

According to the present invention, this technical problem is solved by a connector which is characterized in that it comprises a body including a tubular portion, the cavity of which has a form adapted to the exterior form of the connecting part of the wiper arm when said part is axially inserted into said tubular portion, the tubular portion comprising two lateral walls provided with a pair of opposite detents acting as a spring in a direction substantially perpendicular to said lateral walls and projecting towards the interior of said tubular portion. The detents of the lateral walls are capable of snapping into the lateral openings of said connecting part of the wiper arm and said body of the connector is further provided with means capable of being snap-fitted onto the pivot pin of the wiper blade in such a way that an articulated connection is realized between the body of the connector and the wiper blade.

BRIEF DESCRIPTION OF THE DRAWINGS

Other characteristics and advantages of the invention will be more fully understood when reading the following portions of the specification in conjunction with the accompanying drawings wherein:

FIG. 5 is a view similar to FIG. 4 showing the connector mounted on the wiper blade;

FIG. 6 is a perspective view of a first type of wiper arm designed for a lateral fitting;

FIG. 7 is a view similar to FIG. 5 showing the wiper arm of FIG. 6 mounted on the wiper blade;

FIG. 8 is a schematic sectional view along line VIII—VIII of FIG. 7;

FIG. 9 is a perspective view of a second type of wiper arm designed for a lateral fitting;

FIG. 10 is a view similar to FIG. 7 showing the wiper arm of FIG. 9 mounted on the wiper blade;

FIG. 11 is a schematic sectional view along line XI—XI of FIG. 10;

DESCRIPTION OF THE PREFERRED EMBODIMENT

Figure 1:
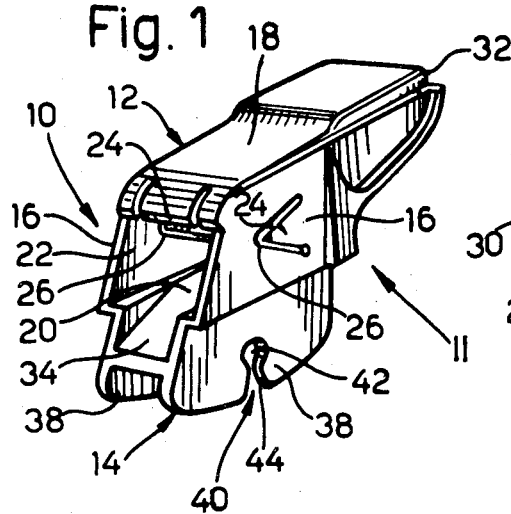
FIG. 1 is a perspective view of a first embodiment of the invention.
Figure 2:
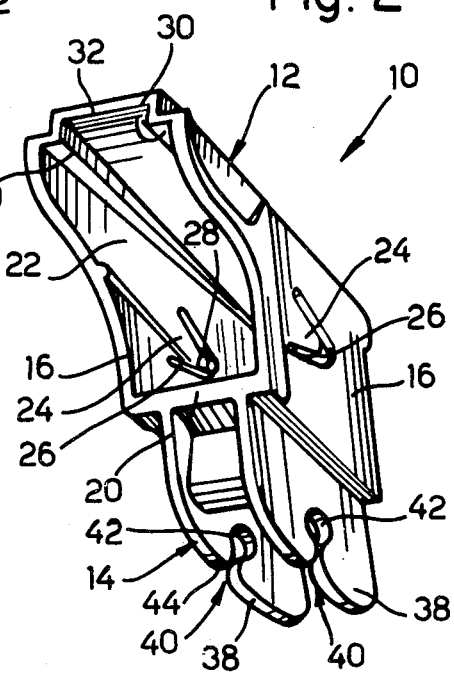
FIG. 2 is a perspective view along arrow II of FIG. 1.

As shown in FIGS. 1 and 2, the connector 11 according to the invention comprises a body 10 made, for example, out of an appropriate plastic material, including a tubular portion 12 and a fork-shaped portion 14 molded in one piece. The tubular portion 12 comprises two lateral walls 16, a top wall 18 and a bottom wall 20 forming a substantially rectangular cavity 22.

The reference number 24 shows two elastic lips provided in the lateral walls 16 and extending in a direction parallel to the axis of the tubular portion 12. The lips 24 have an axially elongated form tapering from the zone of their attachment to the lateral walls 16 and a slot 26 surrounding each lip 24. The free end portions of the lips 24 each comprise a detent 28 having a substantially cylindrical form and projecting towards the interior of the cavity 22 of the tubular portion 12. Thus, the detents 28 extend elastically, with respect to the tubular portion 12, in a direction substantially perpendicular to the lateral walls 16 of said tubular portion 12.

The internal surface of the tubular portion 12 is provided, as shown in FIGS. 2, 8, 11 and 13, with two axially extending shoulders 30 near the top wall 18. These shoulders 30 also extend inside of an appendage 32, which substantially has the form of an inverted channel and which is connected to the top wall 18 and lateral walls 16 of the tubular portion 12. The bottom wall 20 of the tubular portion 12 is provided with two lateral and axially extending grooves 36 and, at the diametrically opposite side of the tubular portion 12 from the appendage 32, with an inclined portion 34.

The fork-shaped portion 14 comprises two walls 38 substantially parallel to the lateral walls 16 of the tubular portion 12 and is connected to the external surface of the bottom wall 20. The walls 38 are provided with two opposite recesses 40 both of which are semi-circularly shaped in their rear end portion 42, the angular amplitude being greater than 180°. Said semi-circular rear end portions 42 are connected to a splayed entry 44 provided with rounded edges.

Figure 3:
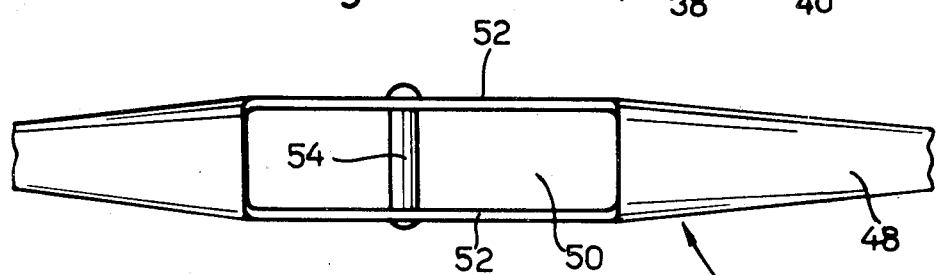
FIG. 3 is a schematic top view of the central portion of a wiper blade designed for a dorsal fitting.

Said fork-shaped portion 14 is necessary in order to releasably and rotatably mount the connector onto a wiper blade, the central portion 46 of which is shown in FIG. 3. This known wiper blade is provided with a superstructure 48 having a substantially rectangular opening 50 in its central portion 46. The lateral flanges 52 of the opening 50 are linked together by a transverse rivet or pivot pin 54.

Figure 4:
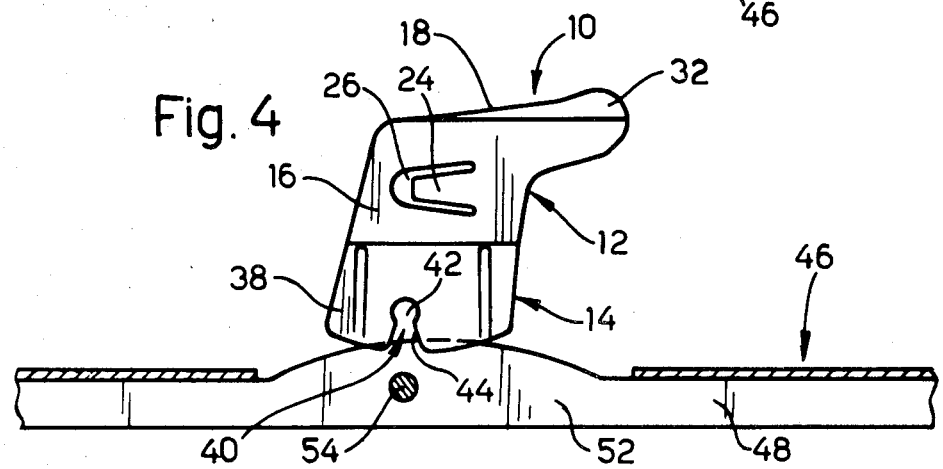
FIG. 4 is a schematic side elevational view showing the connector of FIGS. 1 and 2 during its fitting onto the wiper blade of FIG. 3.

The way to attach the connector to the wiper blade is shown in FIGS. 4 and 5. The fork-shaped portion 14 is first placed between the flanges 52 of the opening 50 in such a way that the recesses 40 are positioned vertically above the pivot pin 54. The connector is then pushed towards the wiper blade and the pivot pin 54, in snapping into the semi-circular rear end portion 42 of the recesses 40, then acts as an articulated connection.

The characteristics of the tubular portion 12 of the connector make it possible to attach the wiper blade to several types of known wiper arms designed for a lateral fitting. One of these wiper arms, shown in FIG. 6, comprises a connecting part 58 secured to the free end portion of a flat rod 57. Said connecting part 58 has substantially the form of an inverted U and comprises two laterally aligned, tubular, cylindrical projections 60.

The way to mount the wiper arm 56 on the connector is shown in FIGS. 7 and 8. The connecting part 58 is axially inserted into the tubular portion 12 through the appendage 32 until the detents 28 on the elastic lips 24 snap into the tubular projections 60 of said connecting part 58. Thanks to the form and dimensions of the cavity 22 of the tubular portion 12, a rigid connection is thus realized between said tubular portion 12 and the connecting part 58 of the wiper arm 56.

In FIG. 9, the reference numeral 62 shows a second type of wiper arm designed for a lateral fitting. The wiper arm comprises an arm 64 having a connecting part 66, substantially in the form of an inverted U, which has a larger width and a smaller height than the corresponding connecting part 58 of the wiper arm 56. Said connecting part 66 is provided with two laterally aligned openings 68 in the flanges of the U, the exterior surfaces of said flanges being apart one from the other by the same distance as the exterior surfaces of the laterally aligned tubular projections 60 of the connecting part 58 of the wiper arm 56.

The mounting of the wiper arm 62 onto the connector is done, as shown in FIGS. 10 and 11, in the same manner as for the wiper arm 56 and a coupling between the connecting part 66 and the internal surface of the tubular portion 12 is thus realized. Indeed, the connecting part 66, thanks to the snapping of the detents 28 into the openings 68, is locked in the cavity 22 of the tubular portion 12, between the lateral walls 16, the shoulders 30 and the bottom wall 20.

Figure 12:
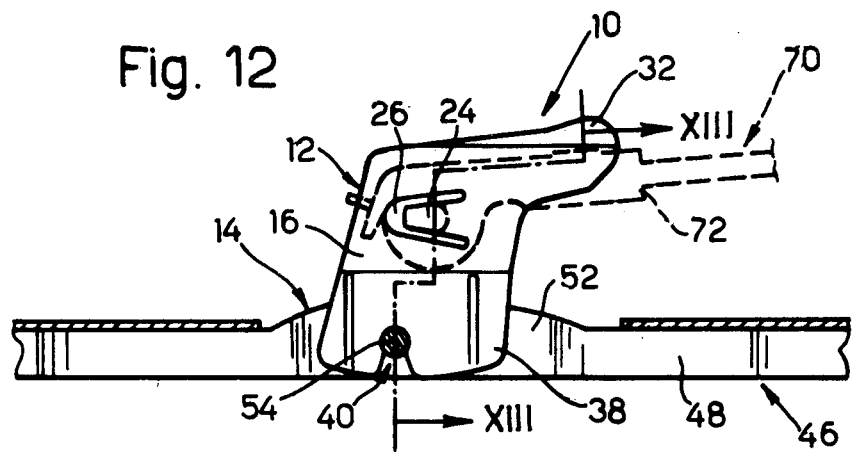
FIG. 12 is a view similar to FIGS. 7 and 10 showing a third type of wiper arm mounted on the wiper blade.
Figure 13:
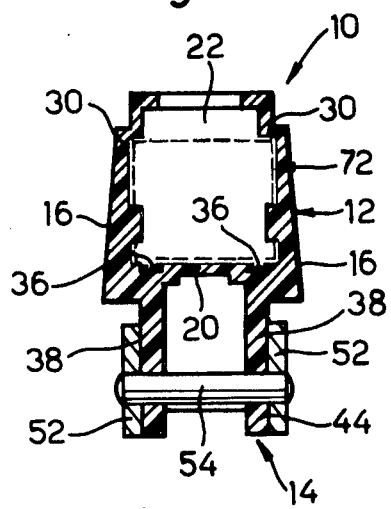
FIG. 13 is a schematic sectional view along line XIII—XIII of FIG. 12.

FIGS. 12 and 13 show a third type of wiper arm 70 mounted on the connector according to the invention. This wiper arm 70 is provided with a connecting part 72 substantially similar to the connecting part 66 of the wiper arm 62, except that said connecting part 72 also projects into the two lateral grooves 36 of the tubular portion 12, as can be seen in FIG. 13.

Figure 14:
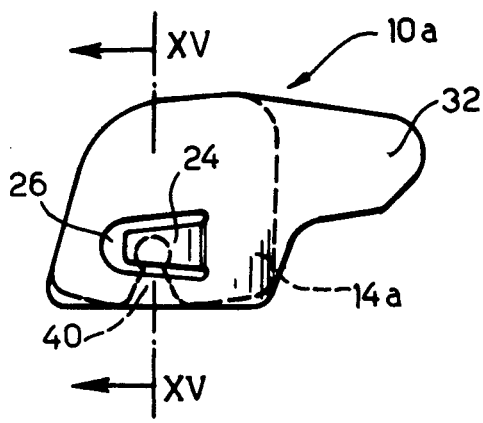
FIG. 14 is a schematic side elevational view of a second embodiment of the invention.
Figure 15:
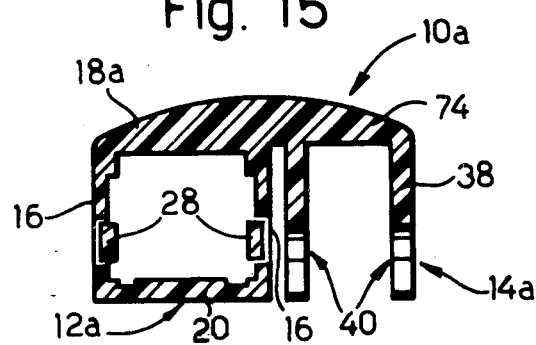
FIG. 15 is a sectional view along line XV—XV of FIG. 14.

FIGS. 14 and 15 show a second embodiment of the connector according to the invention, the only difference between this embodiment and the preceding embodiment is the fact that the tubular portion 12a and the fork-shaped portion 14a are linked together by a lateral projection 74 of the top wall 18a of the tubular portion 12a. Said two portions 12a, 14a are absolutely similar to the corresponding portions 12, 14 of the first embodiment and this lateral connecting device or connector 10a is also made in one piece.

The way to mount the connector 10a onto the wiper blade and to the wiper arms 56,62,70 is also exactly the same as in the first embodiment. However, whilst in the first embodiment, the connecting parts 58,66,72 of the different wiper arms 56,62,70 are located above the superstructure 48 of the wiper blade, said same connecting parts 58,66,72 are positioned laterally with respect to the superstructure 48 of the wiper blade in the second embodiment.

The conclusion of the above disclosure is that the connecting device or connector according to the invention makes it possible to attach a wiper blade designed for a dorsal fitting to a certain number of different types of wiper arms designed for a lateral fitting, said connector being of a very simple and economical construction and, moreover, being easily and rapidly connectable and disconnectable from the wiper blade as well as from the wiper arm.

It will be understood that the present invention is not limited to the exact construction shown and described, but that various changes and/or modifications may be made without departing from the spirit and scope of the invention as defined in the appended claims.

I claim:

1. A connecting device for attaching a wiper blade designed for a dorsal fitting, comprising a superstructure provided with a central substantially rectangular opening and with a transverse pivot pin in the portion corresponding to said central opening, to a wiper arm designed for a lateral fitting and comprising a connecting part at a free end portion, said connecting part having an inverted U-shaped configuration with parallel sides in which are formed two laterally aligned openings, characterized in that said connecting devices comprises a body (10,10a) including a tubular portion (12,12a), the cavity (22) of which has a form substantially matching the exterior form of said connecting part (58,66,72) when said part (58,66,72) is axially introduced into said tubular portion (12,12a), the tubular portion (12,12a) comprising two lateral walls (16), each wall having an inwardly angled lip with a detent (28) on a freely suspended inner end, each detent acting as a spring in a direction substantially perpendicular to said lateral walls (16) and projecting towards the interior (22) of said tubular portion (12,12a), said detents (28) snapping into said laterally aligned openings (60,68) of said connecting part (58,66,72) of the wiper arm (56,62,70, said body (10,10a) of the connecting device being further provided with a forked shaped portion (14,14a) having means (42,44) capable of being snap-fitted onto the pivot pin (54) of the wiper blade in such a way that an articulated connection is realized between said body (10,10a) and the wiper blade.

2. A connecting device according to claim 1, characterized in that said lips (24) have an elongated form extending in a direction parallel to the axis of the tubular portion (12,12a), and said lips are attached to the respective lateral walls (16) with their extremity nearest to the insertion zone of the wiper arm (56,62,70).

3. A connecting device according to claim 2, characterized in that each of the elastic lips (24) has a form which tapers from the zone of their attachment to the lateral walls (16) towards their free end portion.

4. A connecting device according to claim 1, characterized in that each elastic lip (24) is positioned in the plane of the respective lateral wall (16) and is separated from said lateral wall (16) by a slot (26) surrounding the portion of each lip (24) which is not attached to said lateral wall (16).

5. A connecting device according to claim 1, characterized in that the internal surface of the tubular portion (12,12a) is provided with axially extending shoulderings (30) and grooves (36) capable of preventing any angular movement between said tubular portion (12,12a) and the connecting part (58,66,72) of the wiper arm (56,62,70).

6. A connecting device according to claim 1, characterized in that the top wall (18,18a) of the tubular portion (12,12a) is provided, on the side corresponding to the insertion zone of the wiper arm (56,62,70), with an appendage (32) substantially in the form of an inverted channel.

7. A connecting device according to claim 1, characterized in that said means (42,44) for the snapping-on of the connecting device onto the pivot pin (54) of the wiper blade comprise a fork-shaped portion (14,14a) including two walls (38) parallel to the lateral walls (16) of said tubular portion (12,12a) and provided with two opposite recesses (40) capable of snapping onto the pivot pin (54) of the wiper blade.

8. A connecting device according to claim 7, characterized in that the recesses (40) of the walls (38) of said fork-shaped portion (14,14a) are each provided with a semi-circular rear end portion (42) having an amplitude superior to 180° and connected to a splayed entry (44) provided with rounded edges.

9. A connecting device according to claim 1, characterized in that said fork-shaped portion (14) is positioned beneath said tubular portion (12).

10. A connecting device according to claim 1, characterized in that said fork-shaped portion (14a) is positioned laterally with respect to said tubular portion (12a).

11. A connecting device according to claim 1, characterized in that the connecting device is made in one piece out of an appropriate plastic material.

* * * * *